United States Patent Office 2,979,844
Patented Apr. 18, 1961

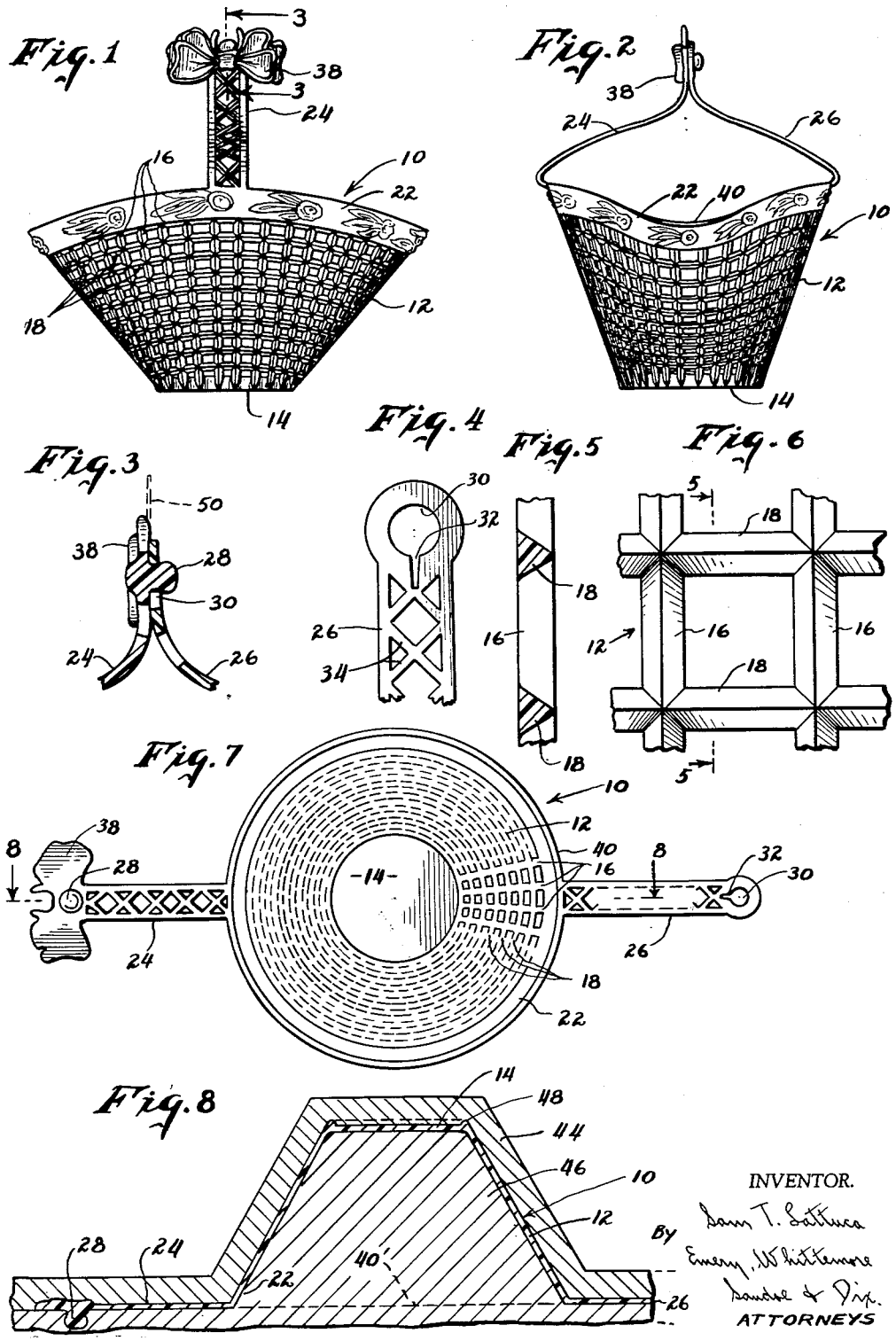

2,979,844

PLASTIC PARTY FAVOR BASKET CONSTRUCTION

Sam T. Lattuca, Hempstead, N.Y., assignor to Best Plastics Corporation, Brooklyn, N.Y., a corporation of New York Filed Sept. 5, 1958, Ser. No. 759,304

9 Claims. (Cl. 41—10)

This invention relates to plastic party favor baskets.

It is an object of this invention to provide a party favor basket that is of attractive shape and ornamentation and of lower cost than comparable party favors of the prior art.

The basket of this invention is made of plastic and is of one-piece construction. The shape and ornamentation make possible the molding of the basket in simple and rugged molding equipment; the handle portions of the basket being molded as outwardly-extending continuations of the upper edge portion of the side wall of the basket.

It is another object of the invention to provide a party favor basket made of a one-piece plastic molding and having handle portions that extend radially outward from the upper edge portion of the side wall of the basket with the flexibility of the handle portions correlated with that of the side wall so that the handle portions bend sharply and upwardly across the top of the basket while distorting the shape of the basket to a somewhat reduced width and generally oval cross-section.

Other objects, features and advantages of the invention will appear or be pointed out as the description proceeds.

In the drawing, forming a part hereof, in which like reference characters indicate corresponding parts in all the views;

Figure 1 is a side elevation of a party favor basket made in accordance with this invention;

Figure 2 is an end view of the party favor basket shown in Figure 1;

Figure 3 is an enlarged sectional view taken on the line 3—3 of Figure 1;

Figure 4 is an enlarged view of the upper end of one of the handle portions of the basket;

Figure 5 is a greatly enlarged sectional view through a portion of the side wall of the basket shown in Figures 1 and 2, the section being taken on the line 5—5 of Figure 6;

Figure 6 is a greatly enlarged fragmentary elevation of a portion of the side wall of the basket;

Figure 7 is a top plan view of the basket with the handle portions extended and before the handle portions have been connected together; and Figure 8 is a view illustrating the manner in which the basket is manufactured, the basket being shown in section along the line 8—8 of Figure 7.

Figure 1 shows a basket 10 having a side wall 12 which extends upwardly from a bottom 14. The side wall diverges as it extends upwardly so as to give the basket a more attractive appearance, and for the purpose of making similar baskets capable of nesting together. Throughout most of the height of the side wall 12, the wall is an open-work pattern consisting of vertical strands 16, best shown in Figure 6, and horizontal strands 18. The space between these strands is open.

In the preferred construction, the strands 16 and 18 are of generally triangular cross-section, as shown in Figure 5. The flat side of the triangular sections is on the inside of the basket. This construction simplifies the molding of the basket and permits the ornamentation to be located on one side only of the mold.

At the upper end portion of the side wall 12 there is a rim 22 which is solid and preferably ornamented with raised figures such as representation of flowers and leaves. The bottom 14 of the basket is circular and the side wall 12 is also circular when the basket is originally molded. However, there are handle portions 24 and 26 connected to the basket on opposite sides, and when these handle portions are connected together, the upper part of the basket is pulled into a generally elliptical cross section. This gives the basket a more attractive appearance and it is made possible by the use of stiffly flexible plastic material in the molding of the basket.

The handle portions 24 and 26 are of one-piece construction with the side wall 12 and extend from the side wall at diametrically opposite locations. Means are provided for connecting the upper ends of the handle portions together. In the preferred construction, these means are of one-piece construction with the handle portions and consists of a ball lug 28 which snaps into an opening 30 in the other handle portion. This construction is somewhat similar to a glove fastener but the opening 30 extends through a section of the handle portion 26 which is of substantially the same thickness as the rest of the handle portion, and the necessary spreading of the opening 30 to receive the ball lug 28 is made possible by providing a notch or slot 32 (Figure 4) in the edge of the opening 30. Both of the handle portions 24 and 26 are shown with an open-work pattern having crossing strands 34 extending diagonally.

The upper end of the handle portion 24 is of greater thickness than the remainder of the handle portion so as to provide the ball lug 28 and an ornamentation in the shape of a bow of ribbon 38 is also molded at the upper end of the handle portion 24 as a one-piece structure with the other parts.

In the molding of the basket, the side wall 12 has a top face 40 (Figure 7) which is in a plane normal to a vertical axis through the bottom 14. This plane 12 is indicated by the dotted line 40' in Figure 8. The handle portions 24 and 26 are molded so that their inner surfaces are in the plane 40'. Only the ball lug 28 extends below this plane 40' when the basket is molded between upper and lower mold parts 44 and 46, respectively. The plastic material from which the basket is molded has sufficient flexibility to permit the ball lug 28 to pull out of the undercut socket in the lower mold part 46.

Since the basket of this invention is intended as a party favor, it is essential that it be of low cost. This is made possible partly by the construction, which permits the use of simple molding apparatus and partly by a construction which uses comparatively little material. The construction obtains a strong basket with minimum material by providing additional thickness only at those regions where it is needed. At the juncture of the side wall 12 with the bottom 14 there is a bead 48. This imparts sufficient stiffness around the circumference of the bottom so that the bottom retains its original flat condition or is only slightly distorted when the upper portions of the side wall are pulled together by the handle portions 24 and 26. Thus, the basket remains relatively stable on a table or other supporting surface. The open-work of the side wall also reduces the amount of material used while at the same time adding to the attractiveness of the appearance. The basket is made of plastic. Various flexible plastics and plastic compositions can be used, such as polyethylene. High impact acetate can also be used.

The material must have sufficient flexibility to permit the handle portions 24 and 26 to bend abruptly at their juncture with the side wall 12. In order to facilitate this bending and still have the sufficient strength in the side wall of the basket, the handle portions are preferably made somewhat thinner than the side wall 12; but this relation depends also upon the spacing of the strands that constitute the side walls since these strands determine the relative stiffness of the side wall. In order to have the handle portions pull the basket into an attractive elliptical cross-section, the handle portions are made so that each one is substantially shorter than the diameter of the upper end of the side wall, this diameter being taken as the diameter of the circular section of the basket as originally molded. In the construction illustrated, each handle portion is only slightly longer than half of the diameter of the top of the basket.

The ornament resembling a bow of ribbon 38 has an area which extends substantially higher than the ball lug 28 when the handle portions are connected together and this can be used to hold a place card 50, indicated in dotted lines in Figure 3. The pull of the handle portions 24 and 26 away from one another below the ball lug 28 causes them to press together above the ball lug and this provides the pressure for holding the place card 50 against the back of the ornament 38. The fact that the ornament is wider than the handle portions 24 and 26, as best shown in Figure 1, stabilizes the position of the place card.

The preferred embodiment of the invention has been illustrated and described, but changes and modifications can be made and some features can be used in different combinations without departing from the invention as defined in the claims.

What is claimed is:

1. A plastic party favor comprising a basket having a bottom, a side wall extending upwardly from the bottom and diverging outwardly toward a top edge of the side wall, handle portions located on opposite sides of the basket and diverging from one another as they extend from the top edge of the side wall when said handle portions are undistorted, the bottom, side wall and handle portions being one piece of stiffly flexible plastic, the side wall and handle portions having ornamental surface contours on their outside surfaces, and means for connecting the free ends of the handle portions when said handle portions are flexed inwardly from the top edge of the side wall and upwardly with their free ends in contact with one another over the bottom of the basket and at a substantially higher level than the top edge of the side wall, the handle portions being of such length as to pull the sides of the basket toward one another where the handle portions contact with the side wall, the plastic material of the side wall being stiff enough to distort outwardly the part of the basket between the handle portions and to elongate the portion of the basket above the bottom.

2. The plastic party favor described in claim 1, and in which the ornamental surface contours on most of the area of the side wall consists of open work formed by spaced-apart circumferentially-extending portions connected by spaced-apart upwardly and downwardly extending portions, all of one-piece construction and of increasing width toward the inside of the basket and with the maximum width of each portion adjacent to its inner surface.

3. The plastic party favor described in claim 1, and in which the side wall has a top edge face that is an annular surface in a plnae normal to a vertical line from the bottom of the basket, and the handle portions of the basket, before being flexed inwardly, have their surfaces, that form the inside of the handle, in the same plane with the annular surface of the top edge face of the side wall.

4. The plastic party favor described in claim 3, and in which the undeflected shape of the basket is circular in cross section, and each handle portion is approximately equal to the radius of the top edge of the side wall, and the flexible side wall of the basket is pulled into a generally oval shape at the upper end of the basket by the connecting together of the handle portions.

5. The plastic party favor described in claim 4, and in which the bottom of the basket has a thickened rim around its periphery and extending below the rest of the bottom for resisting deformation of the bottom from its undistorted circular shape and for increasing the stability of the basket when the side wall is pulled into a generally oval shape by the connecting together of the handle portions.

6. The plastic party favor described in claim 3 and in which the handle portions are thinner than the side wall of the basket so that they bend more easily than the side wall so as to reduce the extent of the distortion of the basket in proportion to the curvature of the handle portion when the handle portions are connected together.

7. The plastic party favor described in claim 1, and in which the means for connecting the free ends of the handle portions include a bulb on one handle portion and extending from it and the other handle portion has a circular opening extending through the full thickness of the said handle portion and slightly smaller than the diameter of the bulb and through which the bulb snaps in either direction to lock the handle portions together with either their inner surfaces confronting one another or with the inner surface of one overlying the outer surface of the other.

8. The plastic party favor described in claim 1, and in which the handle portions are bent upwardly with a sharp bend of small radius at the region at the top edge of the side wall and each of the handle portions bends inwardly with increasing radius of curvature to a point of flexure beyond which the handle portions curve upwardly to a region at its upper end where the inner faces of the handle portions confront one another and said handle portions are joined together by the means for connecting their upper ends, at least one of the handle portions having a decoration at its upper end where the handle portions join together.

9. The plastic party favor described in claim 1, and in which each handle portion is flexed inwardly and upwardly about centers of curvature inward of the handle portion and to a point of flexure above which the handle portion is flexed upwardly about centers of curvature outward of the handle portion, and the upper ends of the handle portions have their inner faces confronting one another and substantially parallel to one another and joined together by said means for connecting the upper ends, both of the handle portions extending somewhat above said means for connecting the upper ends to provide adjacent surfaces of the stiffly flexible plastic between which a place card can be inserted and by which the place card is held in position by friction resulting from the pressure of the faces of the handle portions toward one another.

References Cited in the file of this patent

UNITED STATES PATENTS

| | | |
|---|---|---|
| D. 159,424 | Lattuca | July 25, 1950 |
| D. 160,178 | Klein | Sept. 19, 1950 |
| D. 179,898 | Hyman | Mar. 19, 1957 |
| 1,667,335 | Varkas et al. | Apr. 24, 1928 |
| 2,192,837 | Lusk | Mar. 5, 1940 |
| 2,791,868 | Viken | May 14, 1957 |
| 2,845,735 | Werner | Aug. 5, 1958 |

FOREIGN PATENTS

| | | |
|---|---|---|
| 27,694 | Great Britain | 1903 |